Figure 1:
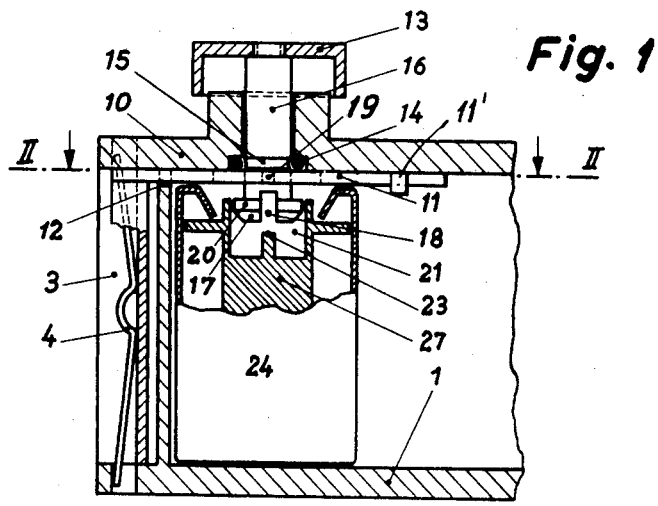

Sept. 11, 1956    A. VON LÖWIS OF MENAR    2,762,280
CAMERA BODIES AND MEANS FOR RELEASABLY HOLDING
FILM SPOOLS THEREIN
Filed Feb. 17, 1953

Inventor:
ALEXANDER VON LÖWIS
OF MENAR
BY:

United States Patent Office 2,762,280
Patented Sept. 11, 1956

2,762,280

CAMERA BODIES AND MEANS FOR RELEASABLY HOLDING FILM SPOOLS THEREIN

Alexander von Löwis of Menar, Schlossgut Mauren, kreis Boblingen, Germany, assignor to Wilhelm Witt, Hamburg, Germany Application February 17, 1953, Serial No. 337,292

Claims priority, application Germany February 25, 1952

17 Claims. (Cl. 95—31)

The present invention relates to cameras.

More particularly, the present invention relates to cameras which have movable covers for giving access to the interior of the camera and to devices for holding a film spool in the cameras.

With conventional cameras which have movable covers, there is usually provided some form of releasable lock mechanism for holding the cover on the camera, and this lock mechanism usually has an outer projection of some type which easily catches on other projections so that it does not infrequently happen that such conventional cameras are accidentally opened which often causes a film strip located in the camera to become exposed to light. Also, with conventional cameras, it very often happens that the film spool is so loosely located in the camera body that when the film is pulled from the film spool the latter becomes tilted and causes jamming of the film. Moreover, such conventional cameras usually include a great number of intricately shaped parts which are difficult and expensive to manufacture and which are held together by screws, rivets, and the like, so that these parts very frequently become loose and either fall from the camera or cause faulty operation thereof.

One of the objects of the present invention is to provide a camera having a removable cover with a means, for holding the cover in place, which has no parts projecting from the camera so that the latter cannot be accidentally opened.

A further object of the present invention is to provide a simple means for holding a film spool in the camera in such a way that the film spool cannot become tilted so that the film strip will not be jammed.

Another object of the present invention is to provide a camera with side walls and a removable rear wall which are mounted on the camera without any screws, rivets, or the like.

An additional object of the present invention is to provide a releasable lock means, for holding a cover in place, which has no parts accessible on the outside of the camera, so that the cover can be released only by movement of parts within the camera.

Still another object of the present invention is to provide a camera with a film winding knob which simultaneously serves as a means for operating a releasable lock means for the camera.

A still further object of the present invention is to provide a camera with a film winding knob which simultaneously prevents tilting of a film spool in the camera.

Yet another object of the present invention is to provide a camera with side walls which may be formed from sections of a rolled length of profiled stock.

The objects of the invention also include the provision of camera side walls which simultaneously serve to releasably hold a cover of the camera in place.

With the above objects in view, the present invention mainly consists of a camera including a camera housing having a removable cover and a pawl means mounted on the housing and engaging the cover to releasably hold the same on the camera housing, this pawl means forming with the housing and cover thereof a smooth, continuous outer surface so that the pawl means cannot be engaged and moved from the outside of the housing. A moving means is located in the interior of the housing for moving the pawl means to release the cover, and an operating means is accessible on the outside of the housing and extends to the interior thereof for operating the moving means, this operating means taking the form of a film winding knob which is movable on the camera housing from a rest position, where the knob prevents tilting of a film spool, in one direction to a film winding position and in an opposite direction to a position in engagement with the moving means for moving the pawl means to release the cover.

Figure 2:
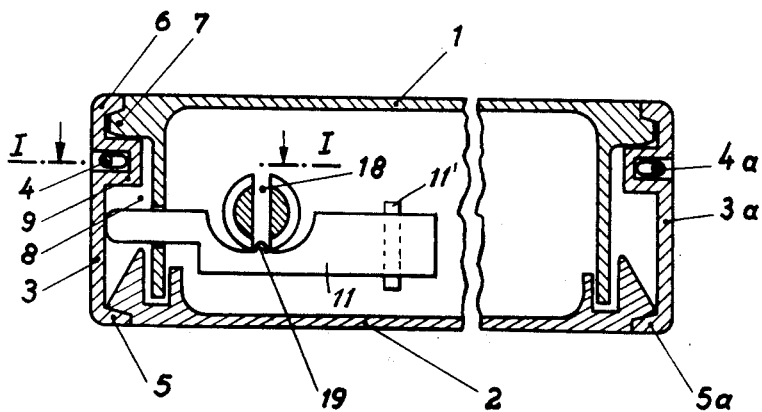

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary, elevational, sectional view of an apparatus constructed in accordance with the present invention taken along line I—I of Fig. 2; and Fig. 2 is a sectional plan view taken in part along line II—II of Fig. 1 and showing a side of the camera opposite to that shown in Fig. 1.

Referring now to the drawings, there is shown therein the camera housing which includes the camera body 1 and the removable rear wall 2 thereof forming a cover for the camera, this rear wall having opposite grooves in which rearwardly extending sides of the body 1 are located when the cover 2 is in position on the camera, as shown in Fig. 2.

As is shown in Fig. 1, the camera includes a top wall 10 and a bottom wall which have side edge portions between which the side wall 3 is located. These side edge portions of the top and bottom walls of the camera are each formed with an opening in which a free end of a wire spring 4 is located, as shown in the drawings. The side wall 3 takes the form of a section of rolled profile stock which is conveniently formed in a continuous length from which side walls 3 may be cut, so that the walls 3 are quite inexpensive.

As is apparent from Fig. 2, the side wall 3 is formed with opposite flanges, the flange 6 engaging a rearwardly located side edge portion 7 of the front wall of camera body 1, and the rear flange 5 engaging the forwardly located side edge portion of the rear wall 2, as is clearly apparent from Fig. 2. These side edge portions of the front and rear walls of the camera form shoulders which mate with flanges 5 and 6 so that the outer surface of front flange 6 forms a continuation of the front face of the camera body 1 and the outer face of the rear flange 5 forms a continuation of the outer face of rear wall 2. In this way when the rear wall 2 is releasably locked on the camera, the combination side wall and locking device 3 forms with the front and rear faces of the camera a smooth continuous surface which does not give any access to a part of wall 3, from the outside of the camera, for moving the wall 3, accidentally or otherwise, away from its locking position. As is shown in Fig. 2, the side edge portion 7 of the front wall of the camera body 1 extends beyond the side wall of camera body 1 to form a free space 8 into which a channel portion 9 of the side wall 3 extends, the wire 4 being located in this channel portion 9.

In order to move the side wall 3 from its locking position, illustrated in Fig. 2, there is provided against the underside of top wall 10 of the camera an elongated bar member 11 which is supported by a strap 11' fixed to the underside of top wall 10 and extends through an opening 12 in the left side wall of camera body 1, as viewed in the drawings, so that the bar member 11 is slidable toward and away from the wall 3. When the member 11 is moved to the left from the position shown in Fig. 2, the side wall 3 will also be moved to the left to give access to the same and rear wall 2 for releasing the latter.

In order to operate the moving member 11, a special winding knob is provided which takes the form of a handle 13 fixed to a shank 16 which extends slidably and rotatably through an elongated bore of the top wall 10, as illustrated in Fig. 1. The shank 16 is formed with an annular groove 15 in which a resilient snap ring 14 is located when the winding knob is in its rest position illustrated in Fig. 1, this snap ring 14 being located in a suitable recess formed in the underside of top wall 10, as shown in Fig. 1.

The shank 16 terminates in a lower enlarged end 17 formed with an elongated cut-out 18 extending transversely to the axis of shank 16, as shown in Figs. 1 and 2. The bar member 11 includes a projection 19, and the operator may move the knob upwardly from the position shown in Fig. 1, the snap ring 14 thereby moving out of the groove 15, until the cut-out 18 at the enlarged end 17 of shank 16 is located opposite the projection 19, as shown in Fig. 2. Then rotation of the knob in one direction will move the bar 11 to the left, as viewed in Fig. 2, to release the rear wall 2 against the action of spring 4. The moving member 11 may then be returned to the rest position shown in Fig. 2. As is evident from Fig. 2, the left side edge portion of rear wall 2 is wedge-shaped in cross-section so that it may simply be snapped back into the locking position. Then the winding knob may be moved down until the snap ring 14 is again located in the groove 15 so as to place the winding knob in its rest position.

In this rest position of the winding knob, the outer annular surface 20 of the enlarged end 17 of shank 16 is located within a cylindrical recess 21 formed in an end of the core 27 of the film spool, which may be placed into or removed from the camera when the winding knob structure is moved upwardly to the position where it engages the projection 19. The core 27 of the film spool is located in the cartridge 24, and the annular surface 20 in the recess 21 prevents tilting of the film spool while permitting free rotation thereof, so that the film cannot become jammed.

The core 27 is provided with a projecting rib 23 extending toward the shank 16 and being shaped to fit within the cut-out 18 so that when the winding knob arrangement is moved downwardly from the rest position shown in Fig. 1, the rib 23 becomes located within the cut-out 18, and the knob 13 may be turned to wind film onto the core 27. Then the knob 13 may be moved upwardly to again locate the winding knob structure in its rest position or upwardly beyond the latter position to open the camera and release the film. Thus, the disclosed winding knob structure is movable from the rest position shown in Fig. 1, in which it is held by cooperation of snap ring 14 with groove 15, in opposite directions, on the one hand, upwardly into engagement with projection 19 for opening the camera and releasing the film and, on the other hand, downwardly to engage the core of the film spool for turning the core.

It is possible to connect the rear wall 2, at its right hand side as viewed in Fig. 2, to the camera in any suitable way to permit movement of the rear wall 2 toward and away from the camera. In the particular example shown in Fig. 2, the side wall 3a, the spring 4a, and the flange 5a are identical with the parts 3, 4 and 5 at the opposite side of the camera so that with this arrangement great advantage may be taken of the inexpensive construction and mounting of the side walls 3 and 3a.

It will be noted that no screws, nuts, rivets or the like are required to interconnect the side walls and rear wall of the camera with the camera body 1, and in this way not only is the cost of the camera greatly reduced, but also there is no risk of any of the parts becoming loose or functioning improperly.

It will be understood that each of the elements described above, or two or more together, may also find a useful application in other types of camera bodies differing from the types described above.

While the invention has been illustrated and described as embodied in camera bodies and means for releasably holding film spools therein, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing having a removable cover; pawl means mounted on said housing and engaging said cover to releasably hold the same on said housing, said pawl means forming with said housing and cover thereof a smooth, continuous outer surface so that said pawl means cannot be engaged and moved from the outside of said housing; moving means located in the interior of said housing for moving said pawl means to release said cover; and operating means accessible on the outside of said housing and extending to the interior thereof for operating said moving means.

2. In a camera, in combination, a camera housing having a removable cover; pawl means mounted on said housing for movement between an open position and a closed position engaging said cover to releasably hold the same on said housing, said pawl means in said closed position thereof forming with said housing and cover thereof a smooth, continuous outer surface so that said pawl means cannot be engaged and moved from the outside of said housing; spring means operatively connected to said pawl means for urging the same to said closed position thereof; moving means located on the interior of said housing for moving said pawl means against the action of said spring means to said open position thereof for releasing said cover; and operating means accessible on the outside of said housing and extending to the interior thereof for operating said moving means.

3. In a camera, in combination, a camera housing having a removable cover; pawl means forming a side of said housing and engaging said cover to releasably hold the same on said housing, said pawl means forming with said housing and cover thereof a smooth, continuous outer surface so that said pawl means cannot be engaged and moved from the outside of said housing; moving means located in the interior of said housing for moving said pawl means to release said cover; and operating means accessible on the outside of said housing and extending to the interior thereof for operating said moving means.

4. In a camera, in combination, a camera housing having a removable cover; pawl means mounted on said housing for movement between an open position and a closed position engaging said cover to releasably hold the same on said housing, said pawl means in said closed position thereof forming with said housing and cover thereof a smooth, continuous outer surface so that said pawl means cannot be engaged and moved from the outside of said housing and said pawl means forming a side of said housing; spring means operatively connected to said pawl means for urging the same to said closed position thereof; moving means located on the interior of said housing for moving said pawl means against the action of said spring means to said open position thereof for releasing said cover; and operating means accessible on the outside of said housing and extending to the interior thereof for operating said moving means.

5. A camera comprising, in combniation, a camera body having top and bottom walls and a front wall interconnecting said top and bottom walls and having a side edge portion located to the rear of the outer face of said front wall and forming a shoulder therewith; a rear wall located opposite said front wall of said camera body and being movable with respect to the latter, said rear wall having a side edge portion located opposite said side edge portion of said front wall being located forwardly of the outer face of said rear wall, and forming a shoulder therewith; a side wall extending between said side edge portions of said front and rear walls and having front and rear flanges engaging said shoulders to hold said front and rear walls at a predetermined distance from each other, said front and rear flanges having outer surfaces which respectively form continuations of said outer faces of said front and rear walls and said side wall being movable with respect to said camera body; spring means engaging said side wall to urge said flanges thereof into engagement with said shoulders; moving means located on the interior of said housing for engaging said side wall to move said rear flange thereof away from said shoulder of said rear wall against the action of said spring means, to release said rear wall for movement away from said camera body; and operating means accessible from the exterior of said housing and extending into the interior thereof for operating said moving means.

6. A camera comprising, in combination, a camera body having top and bottom walls respectively formed with opposite openings located adjacent opposite side edges thereof and having a front wall interconnecting said top and bottom walls and having a side edge portion located adjacent to said side edges of said top and bottom walls, to the rear of the outer face of said front wall and forming a shoulder therewith; a rear wall located opposite said front wall of said camera body and being movable with respect to the latter, said rear wall having a side edge portion located opposite said side edge portion of said front wall, being located forwardly of the outer face of said rear wall, and forming a shoulder therewith; a side wall extending between said top and bottom walls and said edge portions of said front and rear walls and having front and rear flanges engaging said shoulders to hold said front and rear walls at a predetermined distance from each other, said front and rear flanges having outer surfaces which respectively form continuations of said outer faces of said front and rear walls and said side wall being movable with respect to said camera body; an elongated wire spring engaging the outer face of said side wall and having opposite free ends respectively located in said openings of said top and bottom walls to urge said flanges of said side wall into engagement with said shoulders; moving means located on the interior of said housing for engaging said side wall to move said rear flange thereof away from said shoulder of said rear wall against the action of said spring, to release said rear wall for movement away from said camera body; and operating means accessible from the exterior of said housing and extending into the interior thereof for operating said moving means.

7. A camera comprising, in combination, a camera body having top and bottom walls and a front wall interconnecting said top and bottom walls and having a side edge portion located to the rear of the outer face of said front wall and forming a shoulder therewith; a rear wall located opposite said front wall of said camera body and being movable with respect to the latter, said rear wall having a side edge portion located opposite said side edge portion of said front wall, being located forwardly of the outer face of said rear wall, and forming a shoulder therewith; a side wall extending between said side edge portions of said front and rear walls and having front and rear flanges engaging said shoulders to hold said front and rear walls at a predetermined distance from each other, said front and rear flanges having outer surfaces which respectively form continuations of said outer faces of said front and rear walls and said side wall being movable with respect to said camera body; spring means engaging said side wall to urge said flanges thereof into engagement with said shoulders; a bar member movably mounted on the interior of said housing for engaging said side wall to move said rear flange thereof away from said shoulder of said rear wall against the action of said spring means, to release said rear wall for movement away from said camera body, said bar member having a projection extending therefrom; a film winding knob turnably mounted on said top wall of said camera body and having a shank movable into and outwardly of said camera body and being formed with a cutout in which said projection of said bar member is located when said knob is in a predetermined position, said shank being formed with a recess in its outer surface; and resilient means mounted in said top wall of said camera body and engaging said recess to releasably hold said knob out of said predetermined position.

8. A camera comprising, in combination, a camera body having top and bottom walls and a front wall interconnecting said top and bottom walls and having a side edge portion located to the rear of the outer face of said front wall and forming a shoulder therewith; a rear wall located opposite said front wall of said camera body and being movable with respect to the latter, said rear wall having a side edge portion located opposite said side edge portion of said front wall, being located forwardly of the outer face of said rear wall, and forming a shoulder therewith; a side wall extending between said side edge portions of said front and rear walls and having front and rear flanges engaging said shoulders to hold said front and rear walls at a predetermined distance from each other, said front and rear flanges having outer surfaces which respectively form continuations of said outer faces of said front and rear walls and said side wall being movable with respect to said camera body; spring means engaging said side wall to urge said flanges thereof into engagement with said shoulders; a bar member movably mounted on the interior of said housing for engaging said side wall to move said rear flange thereof away from said shoulder of said rear wall against the action of said spring means, to release said rear wall for movement away from said camera body, said bar member having a projection extending therefrom; a film winding knob turnably mounted on said top wall of said camera body and having a shank movable into and outwardly of said camera body and being formed with a cutout in which said projection of said bar member is located when said knob is in a predetermined position, said shank being formed with an annular recess in its outer surface; and a snap ring mounted in said top wall of said camera body and engaging said recess to releasably hold said knob out of said predetermined position.

9. A camera comprising, in combination, a camera body having top and bottom walls and a front wall interconnecting said top and bottom walls and having a side edge portion located to the rear of the outer face of said front wall and forming a shoulder therewith; a rear wall located opposite said front wall of said camera body and being movable with respect to the latter, said rear wall having a side edge portion located opposite said side edge portion of said front wall, being located forwardly of the outer face of said rear wall, and forming a shoulder therewith; a side wall extending between said side edge portions of said front and rear walls and having front and rear flanges engaging said shoulders to hold said front and rear walls at a predetermined distance from each other, said front and rear flanges having outer surfaces which respectively form continuations of said outer faces of said front and rear walls and said side wall being movable with respect to said camera body; spring means engaging said side wall to urge said flanges thereof into engagement with said shoulders; a bar member movably mounted on the interior of said housing for engaging said side wall to move said rear flange thereof away from said shoulder of said rear wall against the action of said spring means, to release said rear wall for movement away from said camera body, said bar member having a projection extending therefrom; a film winding knob turnably mounted on said top wall of said camera body and having a shank movable into and outwardly of said camera body and having in the interior of the latter an enlarged end portion formed with a cutout in which said projection of said bar member is located when said knob is in a predetermined position, said shank being formed with a recess in its outer surface and being adapted to have said enlarged end portion thereof located in an opening of a film spool to prevent tilting of the latter; and resilient means mounted in said top wall of said camera body and engaging said recess to releasably hold said knob out of said predetermined position.

10. A camera comprising, in combination, a camera body having top and bottom walls and a front wall interconnecting said top and bottom walls and having a side edge portion located to the rear of the outer face of said front wall and forming a shoulder therewith; a rear wall located opposite said front wall of said camera body and being movable with respect to the latter, said rear wall having a side edge portion located opposite said side edge portion of said front wall, being located forwardly of the outer face of said rear wall, and forming a shoulder therewith; a side wall extending between said side edge portions of said front and rear walls and having front and rear flanges engaging said shoulders to hold said front and rear walls at a predetermined distance from each other, said front and rear flanges having outer surfaces which respectively form continuations of said outer faces of said front and rear walls and said side wall being movable with respect to said camera body, spring means engaging said side wall to urge said flanges thereof into engagement with said shoulders; a bar member movably mounted on the interior of said housing for engaging said side wall to move said rear flange thereof away from said shoulder of said rear wall against the action of said spring means, to release said rear wall for movement away from said camera body, said bar member having a projection extending therefrom; a film winding knob turnably mounted on said top wall of said camera body and having a shank movable into and outwardly of said camera body and having in the interior of the latter an enlarged end portion formed with a cutout in which said projection of said bar member is located when said knob is in a predetermined position, said shank being formed with a recess in its outer surface; resilient means mounted in said top wall of said camera body and engaging said recess when said knob is moved into said camera body from said predetermined position thereof to a rest position to releasably hold said knob in said rest position; a film spool located in said camera body and having an open end portion in which said enlarged end portion of said shank is located when said knob is in said rest position thereof; and a rib located in said open end portion of said film spool opposite said cutout of said enlarged end portion of said shank to be engaged by the latter when said shank is moved further into said camera body from said rest position thereof to a third position where said winding knob may be rotated to turn said film spool.

11. A camera comprising, in combination, a camera body having top and bottom walls respectively formed with opposite openings located adjacent opposite side edges thereof and having a front wall interconnecting said top and bottom walls and having a side edge portion located adjacent to said side edges of said top and bottom walls, to the rear of the outer face of said front wall and forming a shoulder therewith; a rear wall located opposite said front wall of said camera body and being movable with respect to the latter, said rear wall having a side edge portion located opposite said side edge portion of said front wall, being located forwardly of the outer face of said rear wall, and forming a shoulder therewith; a side wall extending between said top and bottom walls and said side edge portions of said front and rear walls and having front and rear flanges engaging said shoulders to hold said front and rear walls at a predetermined distance from each other, said front and rear flanges having outer surfaces which respectively form continuations of said outer faces of said front and rear walls and said side wall being movable with respect to said camera body and being formed on its outer face with an elongated groove extending between said top and bottom walls; an elongated wire spring located in said groove, engaging the outer face of said side wall and having opposite free ends respectively located in said openings of said top and bottom walls to urge said flanges of said side wall into engagement with said shoulders; moving means located on the interior of said housing for engaging said side wall to move said rear flange thereof away from said shoulder of said rear wall against the action of said spring, to release said rear wall for movement away from said camera body; and operating means accessible from the exterior of said housing and extending into the interior thereof for operating said moving means.

12. A camera comprising, in combination, a camera body having top and bottom walls each of which is formed with a pair of openings located adjacent opposite side edges thereof, said camera body having a front wall interconnecting said top and bottom walls and having opposite side edge portions located adjacent to said side edges of said top and bottom walls, respectively, and being located to the rear of the outer face of said front wall to form a pair of front shoulders therewith; a rear wall located opposite said front wall of said camera body and having opposite side edge portions respectively located opposite said side edge portions of said front wall and being located forwardly of the outer face of said rear wall to form a pair of rear shoulders therewith; a pair of opposite side walls extending between said top and bottom walls and said side edge portions of said front and rear walls and each having a front and rear flange, said front flanges of said side walls respectively engaging said pair of front shoulders and said rear flanges of said side walls respectively engaging said pair of rear shoulders to hold said front and rear walls at a predetermined distance with respect to each other, and said front and rear flanges of said side walls having outer surfaces forming continuations of said outer faces of said front and rear walls; a pair of elongated wire springs respectively engaging the outer faces of said side walls and having free ends respectively located in said openings of said top and bottom walls to urge said flanges of said side walls respectively into engagement with said shoulders; moving means located in the interior of said housing adjacent one of said side walls for engaging the same to move said rear flange thereof away from said rear wall to release the latter; and operating means accessible from the exterior of said housing and extending into the interior thereof for operating said moving means.

13. In a camera, in combination, a camera housing having a removable cover; pawl means mounted on said housing and engaging said cover to releasably hold the same on said housing; a rewind knob for rewinding a film spool in the camera; support means forming part of said camera and supporting said rewind knob for movement along its axis to a position where said rewind knob is disconnected from a spool in the camera; and movement transmitting means carried by said housing for transmitting turning movement of said rewind knob, only when the latter is in said position thereof, to said pawl means for actuating the latter to release said cover.

14. In a camera, in combination, a camera housing having a removable cover; pawl means mounted on said housing and engaging said cover to releasably hold the same on said housing; a rewind knob for rewinding a film spool in the camera; a pusher bar having an end located next to said pawl means; first support means forming part of said camera and supporting said bar for movement toward and away from said pawl means; second support means forming part of said camera and supporting said rewind knob for movement along its axis to a position where said rewind knob is disconnected from a spool in the camera; and means on said bar and rewind knob for transmitting turning movement of the latter to said bar, only when said rewind knob is in said position, to actuate said pawl to release said cover.

15. In a camera, in combination, a camera housing having a removable cover; pawl means mounted on said housing and engaging said cover to releasably hold the same on said housing; rewind knob means mounted on said housing for movement from an intermediate position centering a spool in the camera in one direction to a second position in engagement with the spool to turn the latter and in an opposite direction to a third position; movement transmitting means carried by said housing for transmitting turning movement of said rewind knob means to said pawl means only when said knob means is in said third position thereof for actuating said pawl means to release said cover; and resilient means engaging said rewind knob means for releasably holding the same in said intermediate position thereof.

16. In a camera, in combination, a camera housing having a removable cover; pawl means mounted on said housing and engaging said cover to releasably hold the same on said housing, said pawl means being in the form of a section of an elongated profiled strip; a rewind knob for rewinding a film spool in the camera; support means forming part of said camera and supporting said rewind knob for movement along its axis to a position where said rewind knob is disconnected from a spool in the camera; and movement transmitting means carried by said housing for transmitting turning movement of said rewind knob, only when the latter is in said position thereof, to said pawl means for actuating the latter to release said cover.

17. In a camera, in combination, a camera housing having a removable cover; pawl means mounted on said housing and engaging said cover to releasably hold the same on said housing, said pawl means being in the form of a section of an elongated profiled strip; a rewind knob for rewinding a film spool in the camera; support means forming part of said camera and supporting said rewind knob for movement along its axis to a position where said rewind knob is disconnected from a spool in the camera; movement transmitting means carried by said housing for transmitting turning movement of said rewind knob, only when the latter is in said position thereof, to said pawl means for actuating the latter to release said cover; and the part of said camera opposite from said pawl means being in the form of an elongated profiled strip of the same construction as that of said pawl means.

References Cited in the file of this patent

UNITED STATES PATENTS

| 1,239,017 | Kroedel | Sept. 4, 1917 |
| 2,506,863 | Fassin | May 9, 1950 |

FOREIGN PATENTS

| 637,583 | Germany | Oct. 31, 1936 |
| 728,565 | Germany | Nov. 28, 1942 |
| 844,704 | Germany | July 24, 1952 |